(12) United States Patent
Yanamandra et al.

(10) Patent No.: US 12,542,145 B1
(45) Date of Patent: Feb. 3, 2026

(54) CUSTOMIZED DIALOGUE AUDIO DE-MIXING AND ADJUSTMENT

(71) Applicant: Amazon Technologies, Inc., Seattle, WA (US)

(72) Inventors: Abhishek Yanamandra, Seattle, WA (US); Daniel Stephen ReMine, Seattle, WA (US); Rohith Mysore Vijaya Kumar, Campbell, CA (US); Sarah Elizabeth Norred, Seattle, WA (US); Avijit Vajpayee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 18/125,078

(22) Filed: Mar. 22, 2023

(51) Int. Cl.
*G10L 21/028* (2013.01)
*G10L 15/08* (2006.01)
*G10L 15/22* (2006.01)
*G10L 21/034* (2013.01)
*G10L 25/57* (2013.01)

(52) U.S. Cl.
CPC ............ *G10L 21/028* (2013.01); *G10L 15/08* (2013.01); *G10L 15/22* (2013.01); *G10L 21/034* (2013.01); *G10L 25/57* (2013.01); *G10L 2015/088* (2013.01)

(58) Field of Classification Search
CPC ....... G10L 21/028; G10L 15/08; G10L 15/22; G10L 21/034; G10L 25/57; G10L 2015/088
See application file for complete search history.

(56) References Cited

U.S. PATENT DOCUMENTS

| 7,437,290 | B2 * | 10/2008 | Danieli | G10L 15/08 704/E21.001 |
|---|---|---|---|---|
| 10,141,010 | B1 * | 11/2018 | Nichols | H04N 21/4542 |
| 11,245,950 | B1 * | 2/2022 | Mahar | G10L 15/26 |
| 11,533,539 | B2 * | 12/2022 | Gattis | H04N 21/4542 |
| 2006/0112812 | A1 * | 6/2006 | Venkataraman | G10L 15/26 704/E15.045 |
| 2016/0029084 | A1 * | 1/2016 | Jarman | H04H 60/48 725/131 |
| 2018/0053519 | A1 * | 2/2018 | Kulavik | G10L 25/51 |

(Continued)

OTHER PUBLICATIONS

Ba Wazir, Abdulaziz Saleh, et al. "Design and implementation of fast spoken foul language recognition with different end-to-end deep neural network architectures." Sensors 21.3 (2021): 710. (Year: 2021).*

(Continued)

*Primary Examiner* — Brian L Albertalli
(74) *Attorney, Agent, or Firm* — Eversheds Sutherland (US) LLP

(57) ABSTRACT

Systems and techniques for automatic audio adjustments to video and/or audio files based on user preferences. The systems and techniques receive data and information to determine content to identify and adjust or remove within the audio data such as a filter list of words or rating data. The systems and techniques further determine the timestamps for the instances within the audio/video file. The audio/video file is de-mixed by a machine learning model into multiple components, for example vocal and non-vocal components. An audio adjustment is made based on the content identified before re-mixing to present the adjusted content to a user.

16 Claims, 8 Drawing Sheets

(56) References Cited

U.S. PATENT DOCUMENTS

| | | | |
|---|---|---|---|
| 2018/0366097 A1* | 12/2018 | Sharp | G10H 1/361 |
| 2019/0179600 A1* | 6/2019 | An | H04N 21/4221 |
| 2020/0135185 A1* | 4/2020 | Stoller | G06N 7/01 |
| 2020/0186851 A1* | 6/2020 | Kahn | H04N 21/233 |
| 2021/0183372 A1* | 6/2021 | Jansson | G10L 15/083 |
| 2021/0275928 A1* | 9/2021 | Ashoori | A63F 13/79 |
| 2023/0186937 A1* | 6/2023 | Uhlich | G10L 15/08 |
| | | | 704/251 |

OTHER PUBLICATIONS

Kilgour, Kevin, et al. "Text-driven separation of arbitrary sounds." arXiv preprint arXiv:2204.05738 (2022). (Year: 2022).*

Schulze-Forster, Kilian, et al. "Joint phoneme alignment and text-informed speech separation on highly corrupted speech." ICASSP 2020-2020 IEEE International Conference on Acoustics, Speech and Signal Processing (ICASSP). IEEE, 2020. (Year: 2020).*

Wazir, Abdulaziz Saleh Ba, et al. "Deep learning-based detection of inappropriate speech content for film censorship." IEEE Access 10 (2022): 101697-101715. (Year: 2022).*

Lee, Sang Won, and Jeffrey Scott. "Word level lyrics-audio synchronization using separated vocals." 2017 IEEE International Conference on Acoustics, Speech and Signal Processing (ICASSP). IEEE, 2017. (Year: 2017).*

Rahimi, Akam, Triantafyllos Afouras, and Andrew Zisserman. "Reading to listen at the cocktail party: Multi-modal speech separation." Proceedings of the IEEE/CVF Conference on Computer Vision and Pattern Recognition. 2022. (Year: 2022).*

Le Magoarou, Luc, Alexey Ozerov, and Ngoc QK Duong. "Text-informed audio source separation. example-based approach using non-negative matrix partial co-factorization." Journal of Signal Processing Systems 79.2 (2015): 117-131. (Year: 2015).*

Schulze-Forster, Kilian, et al. "Phoneme level lyrics alignment and text-informed singing voice separation." IEEE/ACM Transactions on Audio, Speech, and Language Processing 29 (2021): 2382-2395. (Year: 2021).*

* cited by examiner

CUSTOMIZED DIALOGUE AUDIO DE-MIXING AND ADJUSTMENT

BACKGROUND

Media content, including video content, is available for consumption by users through a variety of sources and devices. In some instances, portions of the media may include offensive, inappropriate, or undesirable content. While some content is appropriate for any audience (e.g., a movie rated G by the Motion Picture Association of America), other content may not be suitable for all audiences. Content filters frequently block access to content based on a content rating and censored versions require manual adjustment of the video content. In many cases, conventional content control systems filter an entire video or audio program when only a portion of the program includes offensive, inappropriate, and/or undesirable content. Additionally, in some instances, such as global releases of a video product, particular words or language may be restricted or disallowed in the region, though it may not be a target of a traditional content filter. Accordingly, it is desirable to provide improved techniques for content control systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
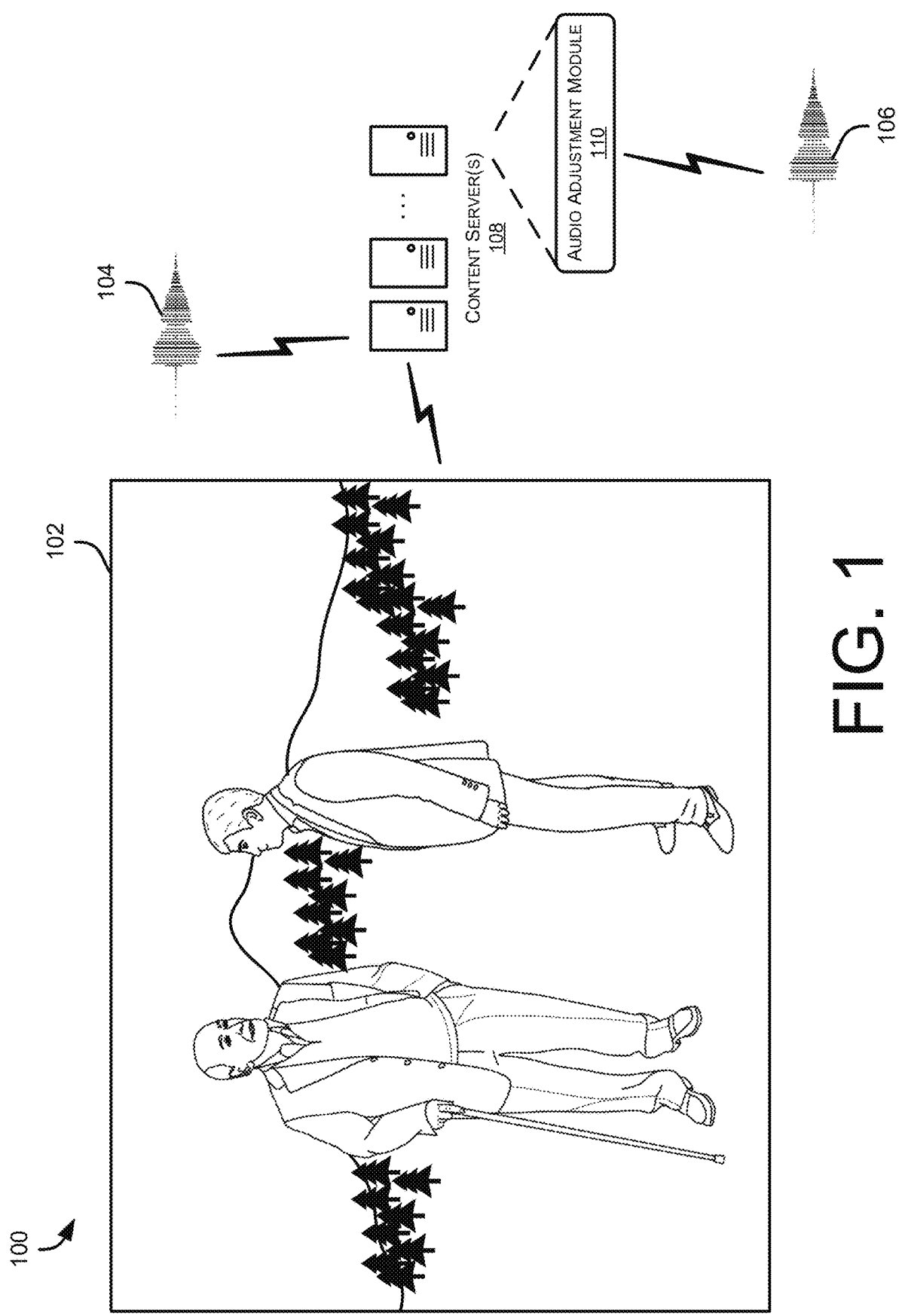
FIG. 1 illustrates an example of a system for customized audio adjustments, according to the present description.

Described herein are, among other things, techniques, devices, and systems, for empowering users to automatically omit content they find objectionable (e.g., profanity) from audio. The systems and techniques described herein extends beyond typical "hard" muting that silences or covers the target word or phrase. For example, to either entirely remove all audio occurring at the time of the omitted phrase, or to add a sound that covers the entire audio at the time of the omitted phrase. The typical hard muting results in a jarring experience for users that is disruptive to the viewing experience for video content and results in loss of information and experience by eliminating all audio at the time of the omitted phrase.

Accordingly, the present description provides for "soft" muting of content from audio, that mutes, reduces, or removes the phrase while keeping the background, or other, sound intact; resulting in a smoother audio experience closer to the unedited audio quality. Though described at places herein with respect to videos having associated audio content, the systems and methods are applicable to audio only, including songs or other such content.

To accomplish the soft muting, a machine learning model is used to de-mix, that is to separate, the components making up the audio data. In some examples, the audio data may be presented as a single waveform. The machine learning model is able to parse the single waveform into different components, such as vocal versus non-vocal components. In this manner, the machine learning model may separate human speech or dialogue present in the waveform from the rest of the audio signal, so only the targeted speech can be silenced or otherwise adjusted. The machine learning model may, in some examples, include a cross-modal text-guided speech separator that breaks the audio into a first vocal and a second component such that the first vocal component corresponds to the text input to the model (e.g., the first vocal component comprises the speech from the text while the second component comprises the remainder of the audio). In this manner, the first vocal component can be muted at the target phrase while preserving the remainder of the audio. In some examples, the machine learning model may include a neural network with self-attention to cross-attend between audio and text (e.g., caption or script text) to align a maximum correlation between their features. In video files, the machine learning model provides for soft muting of the target audio that may typically be missed by an automatic speech recognition solution.

In an example, a system is provided having one or more processors and a non-transitory computer-readable medium having instructions stored thereon that, when executed by the one or more processors, cause the one or more processors to perform operations. The operations may include determining, based on a user input, a target word to identify within first audio data associated with a video file. The target word may be a word that a user wishes to filter out of the content, such as profanity or other terms or phrases that the user wishes to remove for one reason or another. In some examples, the target word or phrase may be a result of a rating associated with the video file, such as a movie rating system based on content to direct users to understand an appropriate audience for the content of the video file. In some examples, the target word or phrase may be based on government regulatory compliance for different territories around the world. The operations may also include determining a timestamp of the first audio data and the video file associated with the target word. The first audio data may be de-mixed into a vocal component and a non-vocal component by inputting the first audio data and text data associated with the first audio data into a cross-modal machine learning separator trained to separate audio data into two components based on sources of the first audio data. The model may be trained using audio waveform data that may be representative of an input with annotated components representing the separated parts of the waveform. In some examples, the audio stream separator may be configured to minimize a difference between target speech and target noise within the audio waveform. In some examples, the model may be trained using audio data with corresponding text data that is synthetically generated (e.g. automatic annotations for the audio data). In some examples, the training data may be generated using publicly available acoustic datasets free from interference or background noise. During training, variations may be added to the dataset to create a nearly infinite number of possible combinations. The model may then be trained on the mixed audio samples (e.g., without interference and with variations) with their corresponding transcripts. Once the vocal and non-vocal components are separated, an audio adjustment may be made to the vocal component at the timestamp to produce an adjusted vocal component, for example to apply negative gain or to mute at the timestamp of the vocal component, removing or reducing the target phrase. The adjusted vocal component and the non-vocal component can be combined to generate second audio data that may be presented with the video file at a user device. Other embodiments of this example may include corresponding computer systems, apparatus, and computer programs recorded on one or more computer storage devices, each configured to perform the actions of the methods.

In another example, the present description provides customized audio adjustments. Initially, the systems and techniques provide for determining content to identify within first audiovisual data. The identified content may include words, phrases, or other content that may be mentioned or uttered in audio data. The method includes determining a timestamp of the first audiovisual data associated with the content. The timestamp may be identified based on a timestamp associated with a text file that corresponds to the audio data, such as subtitle or script data. The audio and the text data may be aligned together by determining a first alignment of text data with the audio and/or audiovisual data using an automated speech recognition model and refining the alignment by dividing the first audiovisual data into a plurality of segments and processing, using the automated speech recognition model, the plurality of segments.

The audio data may be de-mixed to divide into two, or more, components. In some examples, the components may include vocal and non-vocal components. In some examples, the components may include target vocal and remainder audio, with the target audio corresponding to an actor or actress associated with the content to be adjusted. The de-mixing may be performed by a machine learning separator trained to separate audio data into two components based on sources of the first audiovisual data, such as whether from a speaker or background noise. After separating, or de-mixing, an audio adjustment may be applied to one, or both, of the components. The audio adjustment may include applying a negative gain (e.g., to quiet a component), muting (to remove), or otherwise adjusting parameters. After the adjustment is applied, the components may be re-mixed or combined together for presenting at a display of a user device.

In some examples, the machine learning model to separate the audio may include a cross-modal speech separator that receives inputs of the audio data as well as text data corresponding to dialogue of the audio data. The cross-modal speech separator used cross-modal correspondence loss for audio signal separation, particularly to separate speech and non-speech components. A cross-modal correspondence loss is calculated using a similarity between the text features and the separated signal's (e.g., the speech component) features. The similarity between the text features and the audio features is calculated using a dot product. The dissimilarity is minimized between the text and the speech component while the distance between the text data and the non-speech component is increased and/or maximized. The cross-modal speech separator outputs components that, when combined, form the audio data or is substantially equal to the audio data.

The systems and methods described herein provide numerous benefits over typical filter and censor technologies. For example, while typical hard muting results in a jarring experience for users that is disruptive to the viewing experience for video content and results in loss of information and experience by eliminating all audio at the time of the omitted phrase, the soft muting described herein is minimally intrusive and only results in removal of the target phrase, without removing all audio or inserting an overlaid tone to mask the target phrase. Accordingly, the present description provides for soft muting of content from audio, that mutes, reduces, or removes the phrase while keeping the background, or other, sound intact; resulting in a smoother audio experience closer to the unedited audio quality. Additionally, the systems and methods described herein provide for accurate and automatic soft muting that is customizable based on user preferences in an automated manner that does not rely on a user to tag or identify timestamps. Further, the automatic methods described herein provide for soft muting of target audio that is typically missed by an automatic speech recognition solution in conventional systems.

Having now discussed examples of the systems and methods described herein, FIG. 1 illustrates an example of a system 100 for customized audio adjustments, according to the present description. In the example of FIG. 1, the system 100 includes content server(s) 108 that host the video data 102 and audio data 104 corresponding to video files, such as movies. Though described at places herein with respect to movies having associated audio content, the systems and methods are applicable to audio only as well, including songs or other such content. In such examples, lyrics may serve as a substitute for caption or text data described with respect to audio data herein. The video data 102 and audio data 104 may include data from movies, videos, songs, dialogue, television programs, music, podcasts, and other sources of video and/or audio data that may be consumed by users in one or more languages. The content server(s) 108 also include an audio adjustment module 110 that can be used to customize audio within the audio data 104, for example to soft mute particular target phrases or content and/or to boost, relatively, vocal tracks over background noise to aid in understanding audio that may otherwise be difficult to discern.

The audio adjustment module 110 provides for boosting or soft muting content within the audio data in order to customize the audio to the preferences of the user. Accordingly, in some examples, the user may select certain words, phrases, content, or other such phrases to mute or reduce in volume while keeping the background and other vocal tracks intact; resulting in a smoother audio experience closer to the unedited audio quality.

The audio adjustment module 110 may include one or more different machine learning models to de-mix or separate a target vocal track from the other audio data. In some examples, the audio data may be presented as a single waveform. The audio adjustment module 110 may be able to parse the single waveform into different components, such as vocal versus non-vocal components, for example using a speech separator, such as the cross-modal speech separator described with respect to FIG. 6. In this manner, the audio adjustment module 110 may separate target speech from the rest of the audio signal, so only the targeted speech can be silenced or otherwise adjusted. The machine learning model may, in some examples, include a cross-modal text-guided speech separator, such as described with respect to FIG. 6, that breaks the audio into vocal and non-vocal components such that the vocal component can be muted at the target phrase while preserving the background or other audio. In some examples, the audio adjustment module 110 may include a neural network with cross-attention to between the modalities, such as audio and text (e.g., caption or script text) to align a maximum correlation between their features. The audio adjustment module 110 may also use self-attention to attend to one modality with itself.

In an illustrative example, a movie is produced having audio data 104 and video data 102, with the video data 102 showing the actors performing and speaking the audio data 104. The audio data 104 may include additional audio such as background noise, vehicles, traffic, weather, explosions, or other such content. In a first iteration of the illustrative example, a parent may wish to adjust what content is presented in the movie such that they are more comfortable with their child viewing the movie. Accordingly, the user may select or enter one or more settings to adjust a rating of the movie (e.g., from Motion Picture Association of America (MPAA) rating of R to a rating of PG-13), provided that such a rating change is available based on language content. In instances where language may be a reason (either wholly or partially) for the rating, the rating guidelines and/or metadata associated with the movie may identify the content that is associated with the rating. In some examples, the rating may be related to government regulatory compliance, with a rating based on a status of compliance with particular regulatory constraints for a given country or territory. Accordingly, the words, phrases, or content may be identified from caption or script data for the movie based on the information regarding what content to remove. In some examples, the user may be able to directly enter particular phrases, words, terms, or other data to identify particular content to remove (mute) from the movie. The audio adjustment module 110 may then parse through the caption data (e.g., text data associated with the audio data 104) to identify instances of the identified content.

After identifying the content, and instances of the content within the movie, the audio adjustment module 110 may de-mix or separate a target vocal track from the other audio data for the movie. In some examples, the audio data may be presented as a single waveform for the entire movie. The audio adjustment module 110 may be able to parse the single waveform into different components, such as vocal tracks versus non-vocal tracks. The audio adjustment module 110 may separate target speech from the rest of the audio signal, so only the targeted speech can be silenced or otherwise adjusted. In the iteration, the audio adjustment module 110 may mute the target speech by muting the audio track associated with the target speech. To identify the portion of the audio track to mute, the audio adjustment module may align the text data with the audio data, such that accurate muting may be performed without capturing audio data besides the targeted speech.

To align the text and the audio data, an automated speech recognition model may be used to identify the words in the audio and then align the text from the text data with the audio data. In some examples, the alignment from the automatic speech recognition may not be sufficient to keep the muting limited to only the target speech. Accordingly, after the first alignment using the automatic speech recognition, the audio adjustment module 110 may divide the audio data into segments, such as segments of one second to five seconds in length or more. In some examples, the segments may be less than one second or more than five seconds. In some examples, the resolution provided by dividing into the segments ensures that words or phrases are not accidentally removed or adjusted in addition to neighboring targeted words or phrases. The segments may then be re-processed by the automatic speech recognition module to identify the target timestamps for the target speech. The shorter segments may ensure that the timestamps are accurate and aligned precisely with the text data. Additionally, the automatic speech recognition may aid in identifying not only a timestamp for the start, but also for the end of the target speech.

After the target speech is identified, the timestamps associated with the target speech are identified. The audio adjustment module 110 de-mixes the audio data. The de-mixing may be performed by one or more machine learning models to separate vocal tracks from non-vocal tracks of the audio data 104. The machine learning model may, in some examples, include a cross-modal text-guided speech separator, such as described with respect to FIG. 6, that breaks the audio into vocal and non-vocal components such that the vocal component can be muted at the target phrase while preserving the background or other audio. In some examples, the audio adjustment module 110 may include a neural network with self-attention to cross-attend between audio and text (e.g., caption or script text) to align a maximum correlation between their features.

After separating the vocal tracks using the audio adjustment module 110, the audio adjustment module 110 may further provide for muting of the target speech. In muting the target speech, the audio adjustment module 110 may mute the vocal track starting at the start timestamp and stopping at the end timestamp for each iteration of the target speech within the vocal track. In this example iteration, the non-vocal track may remain unadjusted.

After adjustments are performed by the audio adjustment module 110, the audio adjustment module 110 re-combines the vocal and non-vocal tracks, specifically by re-mixing the adjusted vocal track with the non-vocal track. Therefore, after combination, the resulting audio presents the audio data 104 associated with the video data 102 with the target speech removed. However, the remaining audio that occurs at the time of the target speech is preserved and remains in place, preserving the flow of the scene in the movie.

In a second iteration, rather than to remove or mute particular target speech, the user may wish to reduce the comparative volume or noise of non-vocal tracks, for example to aid with understanding audio from actors that may be difficult to understand due to, for example, action or other loud noises within the movie. In this second iteration, the audio may not include target speech, but may include target content, e.g., background noise, that the user wishes to partially suppress relative to the conversational dialogue between actors, and thereby improve their understanding of the scene. In such examples, the audio adjustment module 110 may serve to identify content, such as the background content, and to apply a negative gain to the non-vocal content, thereby decreasing the relative volume of the background noises while preserving the vocal content and making it easier to hear.

In the second iteration, the audio adjustment module 110 de-mixes the vocal and non-vocal tracks, as described above. However, after de-mixing the tracks, a negative gain may be applied to the non-vocal track before recombining to present to the user. In some examples, the system may enable a user to target particular content for noise suppression, such as explosions, gunfire, road noise, or the user may be able to select setting through the system to maintain a comparative volume difference between the vocal track and the non-vocal track. In some examples, the audio adjustment module 110 may be used to suppress sudden increases in volume, and thereby reduce a jarring experience from a sudden loud event within the movie, such as an explosion.

The audio adjustment module 110 may be embodied in the content server(s) 108 which may include back-end servers for a service provider. In this manner, the processing of audio data for various movies may be pre-processed, for example to pre-separate or de-mix the vocal and non-vocal tracks. In this manner, the user may be able to customize the audio experience in or near real-time without waiting for processing. In some examples, the movie data may be processed at the content server(s) 108 to pre-prepared profiles, for example to allow a user to select from pre-prepared profiles for different ratings, certain language, certain content, and other such adjustments that may be commonly selected. Due to superposition in audio waveforms, the audio samples may be added together piece by piece to re-assemble and/or re-mix the audio.

Figure 2:
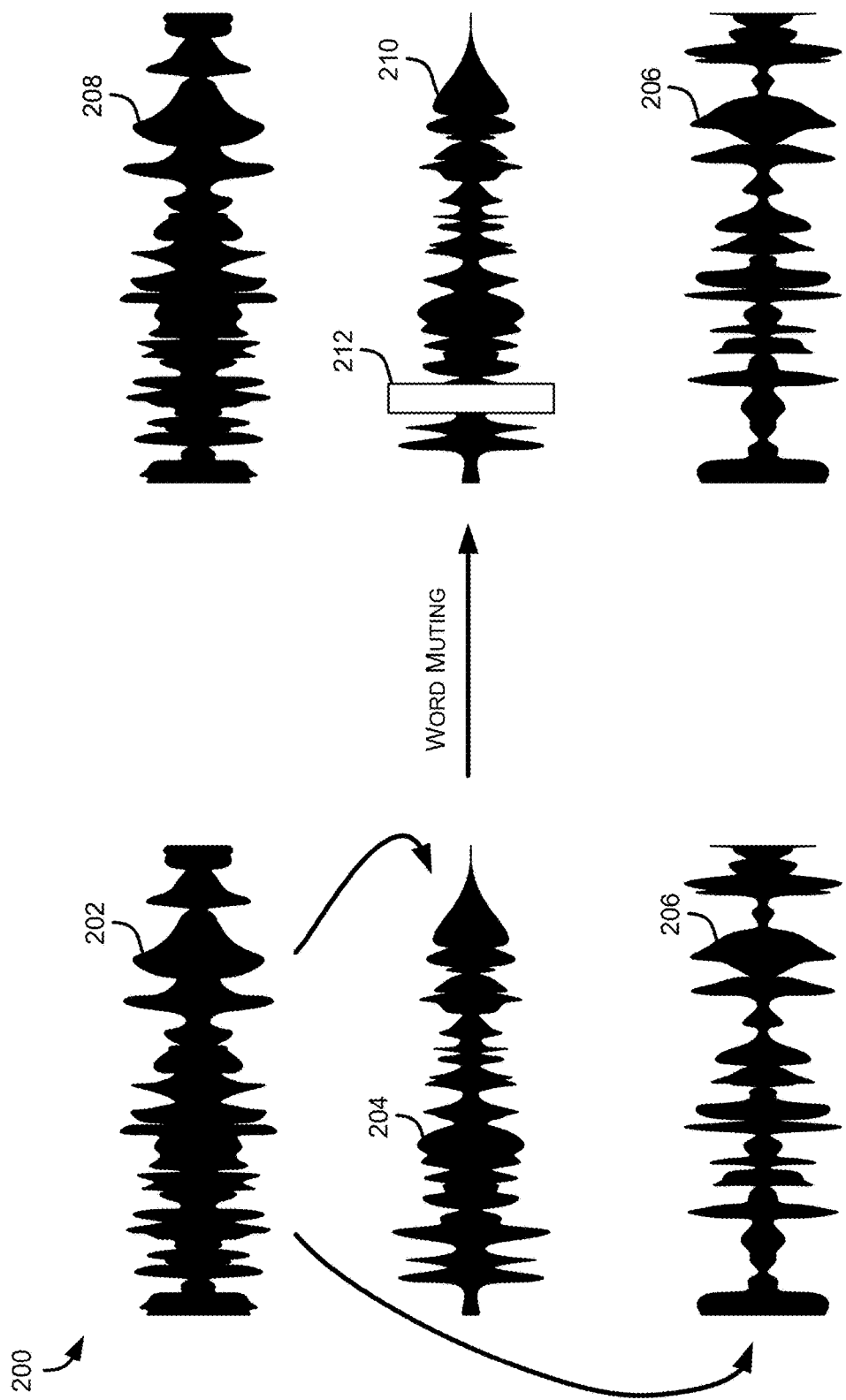
FIG. 2 illustrates an example of audio content being de-mixed and adjusted to mute a portion of a vocal track, according to at least one example.

FIG. 2 illustrates an example 200 of audio content being de-mixed and adjusted to mute a portion of a vocal track, according to at least one example. A first audio signal 202 is illustrated that may correspond to a movie, or in some examples, may be a song or other such audio file. The first audio signal 202 may be presented as a single waveform (e.g., without individual tracks for different components of the audio). For one or more reasons, such as described herein, a user may wish to adjust one or more characteristics of the first audio signal 202, for example to remove instances of a particular phrase. The phrase may be identifiable from associated text data, such as lyrics or caption data that corresponds with the first audio signal 202. In some examples, the user may be able to directly enter particular phrases, words, terms, or other data to identify particular content to remove (mute) from the first audio signal 202. The instances may be identified from the caption and/or lyric data.

After identifying the content, and instances of the content within the first audio signal 202, the first audio signal 202 may be separated into two or more separate tracks. The first audio signal 202 may be parsed into different components, such as vocal tracks versus non-vocal tracks. A first component 204 may represent the vocal track of the first audio signal 202. A second component 206 may represent the non-vocal tracks of the first audio signal 202. In some examples, more than two tracks may be separated, for example with a separate audio track for different characters. In this manner, the first component 204 may be adjusted to remove the phrase from the first audio signal 202 without impacting any of the second component 206. For example, by muting 212 the phrase, the system may generate adjusted first component 210. The adjusted first component 210 and the second component 206 may be combined to generate a second audio signal 208. The second audio signal 208 includes all of the second component 206 and includes the first component 204 with the phrase muted. Therefore, when the second audio signal 208 is played, the user or audience will hear the background and all the noise in the audio file, with the exception of the target phrase, which will be muted.

To identify the muting 212, the system may align the text data with the first audio signal 202 and/or the first component 204, such that muting 212 may be performed accurately without capturing audio data besides the targeted speech. To align the text and the audio data, an automated speech recognition model may be used to identify the words in the audio and then align the text from the text data with the audio data. In some examples, the alignment from the automatic speech recognition may not be sufficient to keep the muting limited to only the target speech. Accordingly, after the first alignment using the automatic speech recognition, a refined alignment may be performed that may divide the audio data into segments, such as segments of one second to five seconds in length or more. The segments may then be re-processed by the automatic speech recognition module to identify the target timestamps for the target speech. The shorter segments may ensure that the timestamps are accurate and aligned precisely with the text data. Additionally, the automatic speech recognition may aid in identifying not only a timestamp for the start, but also for the end of the target speech.

After the target speech is identified, the timestamps associated with the target speech are identified. The muting 212 may be applied based on the timestamps for the phrase. The muting 212 is applied to de-mixed data, such as the first component 204. After separating the vocal tracks, the system may further provide for muting of the target speech.

After adjustments are performed, the adjusted first component 210 and the second component are re-combined, specifically by re-mixing the adjusted vocal track with the non-vocal track. Therefore, after combination, the resulting audio presents the second audio signal 208 with the target speech removed. However, the remaining audio that occurs at the time of the target speech is preserved and remains in place, preserving the flow of the scene in the movie and/or audio file.

Figure 3:
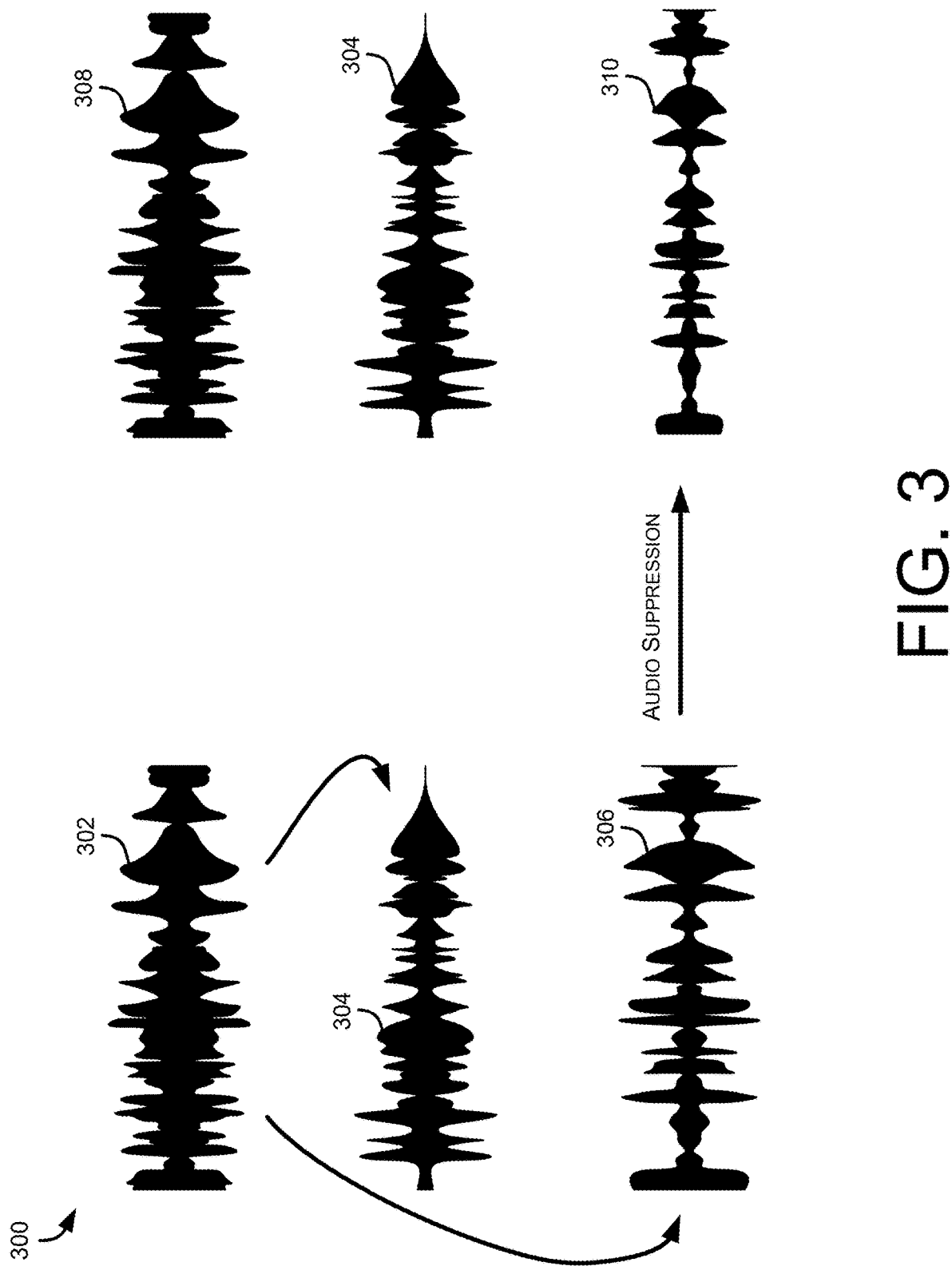
FIG. 3 illustrates an example of audio content being de-mixed and adjusted to de-emphasize non-vocal content, according to at least one example.

FIG. 3 illustrates an example 300 of audio content being de-mixed and adjusted to de-emphasize non-vocal content, according to at least one example. In the example 300, rather than suppressing a phrase or word, the user may be struggling to clearly hear or discern a conversation and wishes to have the relative volume of the conversation increased, or in other words, to decrease the relative noise of components other than the conversation within the audio data. In this example, the audio may not include target speech, but may include target content, e.g., background noise, that the user wishes to partially suppress relative to the conversational dialogue between actors, and thereby improve their understanding of the scene.

In the example 300, a first audio signal 302 includes vocal and non-vocal content. Accordingly, as described herein, the vocal and non-vocal components may be separated or de-mixed into the first component 304 and the second component 306. The first component 304 may correspond to a vocal track while the second component 306 may correspond to background or other content in the scene. The system may apply a negative gain to the non-vocal content of the second component 306, thereby decreasing the relative volume of the background noises while preserving the vocal content and making it easier to hear.

After de-mixing the tracks, a negative gain may be applied to the second component 306 to produce an adjusted second component 310. In some examples, other types of adjustments may be made, such as audio suppression through linear and non-linear methods. The adjusted second component is illustrated as having an across the board reduction in amplitude. In some examples, the negative gain may be scalar while in other examples, the gain may only be applied to audio data over a certain threshold. In some examples, the gain may be a non-scalar that adjusts different amplitudes differently. In some examples, the system may enable a user to target particular content for noise suppression, such as explosions, gunfire, road noise, or the user may be able to select setting through the system to maintain a comparative volume difference between the vocal track and the non-vocal track. In some examples, the system may be used to suppress sudden increases in volume, and thereby reduce a jarring experience from a sudden loud event within the movie, such as an explosion. The adjusted second component 310 and the first component 304 may be recombined to form second audio signal 308 that has the compensation applied to make understanding the conversation easier.

In some examples, the types of adjustments shown and described with respect to FIGS. 2 and 3 may be applied simultaneously. For example, a user may wish to remove certain content and also to reduce the relative noise of the background in the audio signal. Various adjustments may be performed on the audio signals based on the selections and setting applied by the user.

Figure 4:
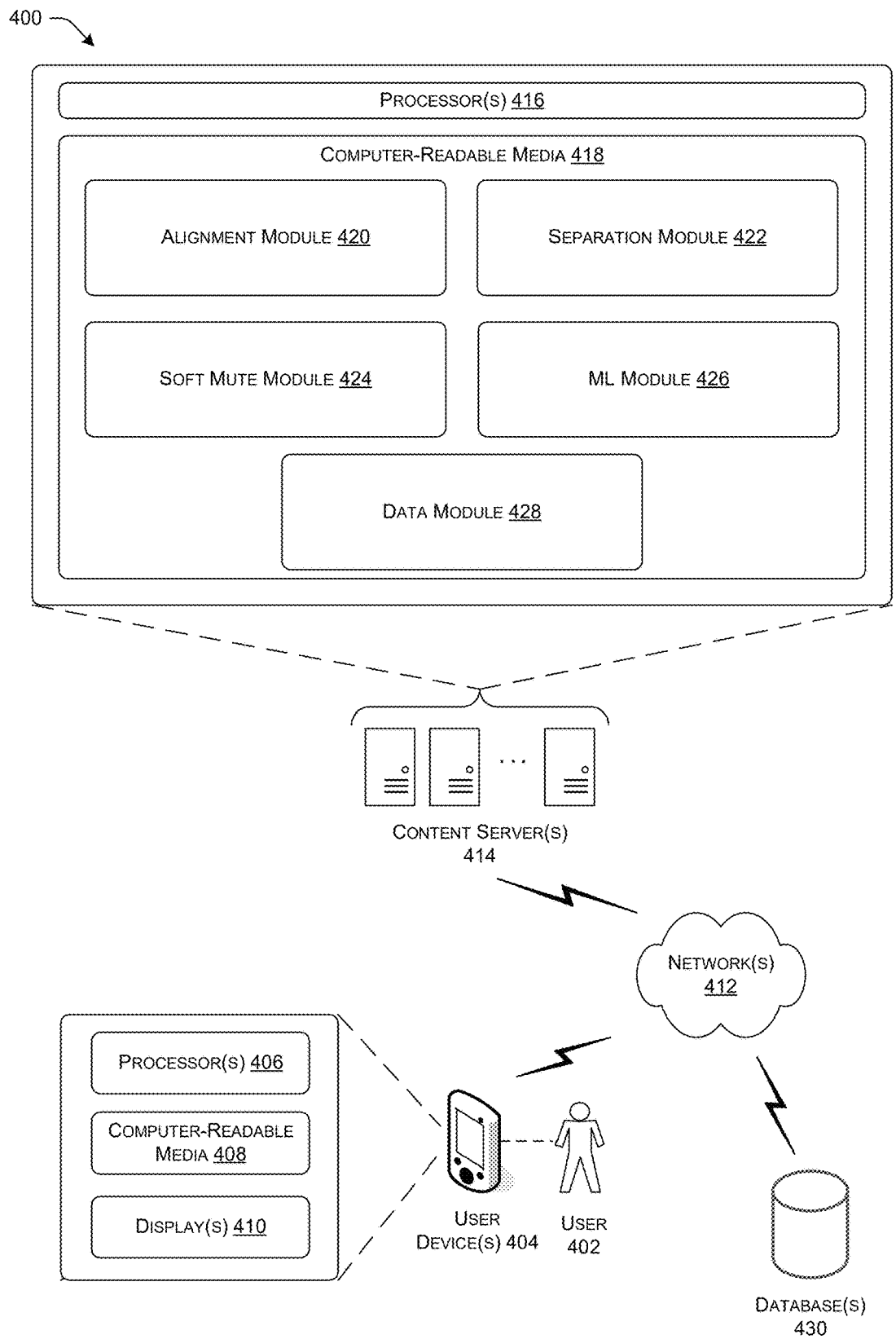
FIG. 4 illustrates an example system architecture for customizing audio adjustments, according to the present description.

FIG. 4 illustrates an example system 400 for customizing audio adjustments, according to the present description. Though FIG. 4 is shown having particular modules and elements, other modules, components, or elements may be used to accomplish the techniques associated therewith. The elements of the example system 400 illustrate an example environment for performing automatic custom audio adjustments as described herein.

As shown in FIG. 4, the example system 400 may include one or more users 402, one or more user devices 404 associated with the users 402, one or more network(s) 412, a database 430 having attribute data, image data, audio data, and/or video data stored thereon, and content server 414. In various embodiments, the user 402 may operate the user device 404, which may include one or more processor(s) 406, computer-readable media 408 and a display 410. The content server 414 may also include one or more processor(s) 416 and computer-readable media 418, which may include an alignment module 420, a separation module 422, a soft mute module 424, a machine learning (ML) module 426, and a data module 428.

In various embodiments, the content server 414 may be a service provider, a service, a video hosting service, or any number of servers or entities that may provide products, services, promotions, articles, advertisements, and/or other media to consumers.

In some embodiments, the user 402 may operate the user device 404 to perform various functions associated with the user device 404, which may include the one or more processor(s) 406, the computer-readable media 408, and the display 410. Furthermore, the user 402 may use the user device 404 to interact with a video, image, article, or other media, or to interact with the content server 414, such as via a website or an application associated with a user device 404.

In some embodiments, the user device 404 may be any type of device that is capable of receiving, accessing, searching data and displaying data to the user 402. For instance, the user device 404 may include a personal computer, a laptop computer, a cellular telephone, a PDA, a tablet device, an electronic book (e-Book) reader device, a gaming console, or any other device that may be used to view image data or to access a platform (e.g., website, application, etc.) associated with the content server 414. The user device 404 shown in FIG. 4 is only one example of a user device 404 and is not intended to suggest any limitation as to the scope of use or functionality of any user device 404 used to perform the processes and/or procedures described herein.

The processor(s) 406 of the user device 404 may execute one or more modules and/or processes to cause the user device 404 to perform a variety of functions, as set forth herein. In some embodiments, the processor(s) 406 may include a central processing unit (CPU), a graphics processing unit (GPU), both CPU and GPU, or other processing units or components known in the art. Additionally, each of the processor(s) 406 may possess its own local memory, which also may store program modules, program data, and/or one or more operating systems.

In at least one configuration, the computer-readable media 408 of the user device 404 may include any components that may be used to view, receive, access, input, or otherwise interact with text, audio, image, and/or video data, including data provided by the content server 414 and/or from the database 430. Depending on the exact configuration and type of the user device 404, the computer-readable media 408 may also include volatile memory (such as RAM), non-volatile memory (such as ROM, flash memory, miniature hard drive, memory card, or the like), or some combination thereof. In some examples, the user device 404 may include modules similar or identical to the alignment module 420, the separation module 422, the soft mute module 424, the machine learning (ML) module 426, and the data module 428. The user device 404 may use the modules to perform the methods described herein without the need to access the content server 414. For example, the user device 404 may use the modules described herein to perform automatic custom audio adjustments to soft mute and/or boost or reduce certain audio content within an audio and/or audiovisual file, or any other technique described herein.

In various embodiments, the user device 404 may also have input device(s) such as a keyboard, a mouse, a pen, a voice input device, a touch input device, etc. The user device 404 may also include the display 410 and other output device(s), such as speakers, a printer, etc. The user 402 may utilize the foregoing features to interact with the user device 404 and/or the content server 414 via the network(s) 412. More particularly, the display 410 of the user device 404 may include any type of display 410 known in the art that is configured to present (e.g., display) information to the user 402.

In some embodiments, the network(s) 412 may be any type of network known in the art, such as the Internet. Moreover, the user device 404, database 430, and the content server 414 may communicatively couple to the network(s) 412 in any manner, such as by a wired or wireless connection. The network(s) 412 may also facilitate communication between the user device 404, database 430, and the content server 414.

In addition, and as mentioned previously, the content server 414 may include the one or more processor(s) 416 and the computer-readable media 418. The content server 414 may also include additional components not listed above that may perform any function associated with the content server 414. In various embodiments, the content server 414 may be any type of server, such as a network-accessible server, and may be one of multiple servers included in a server cluster or server farm. In other embodiments, the processor(s) 416 and the computer-readable media 418 of the content server 414 may be the same as, similar to, or different from the processor(s) 406 and the computer-readable media 408, respectively, of the user device 404.

The alignment module 420 may be used to align text and audio data across the different modalities. Specifically, the audio and the text data may be aligned together by determining a first alignment of text data with the audio and/or audiovisual data using an automated speech recognition model and refining the alignment by dividing the first audiovisual data into a plurality of segments and processing, using the automated speech recognition model, the plurality of segments.

In some examples, to align the text and the audio data, an automated speech recognition model may be used by the alignment module 420 to identify the words in the audio and then align the text from the text data with the audio data. In some examples, the alignment from the automatic speech recognition may not be sufficient to keep the muting limited to only the target speech. Accordingly, after the first alignment using the automatic speech recognition, the alignment module 420 may divide the audio data into segments, such as segments of one second to five seconds in length or more. The segments may then be re-processed by the automatic speech recognition module to identify the target timestamps for the target speech. The shorter segments may ensure that the timestamps are accurate and aligned precisely with the text data. Additionally, the automatic speech recognition may aid in identifying not only a timestamp for the start, but also for the end of the target speech.

The separation module 422 may be responsible for de-mixing the mixed audio into components. The audio data may be de-mixed to divide into two, or more, components. In some examples, the components may include vocal and non-vocal components. In some examples, the components may include target vocal and remainder audio, with the target audio corresponding to an actor or actress associated with the content to be adjusted. The de-mixing may be performed by a machine learning separator trained to separate audio data into two components based on sources of the first audiovisual data, such as whether from a speaker or background noise. After separating, or de-mixing, an audio adjustment may be applied to one, or both, of the components. The audio adjustment may include applying a negative gain (e.g., to quiet a component), muting (to remove), or otherwise adjusting parameters. After the adjustment is applied, the components may be re-mixed or combined together for presenting at a display of a user device.

In some examples, the separation module 422 de-mixes the audio data by using one or more machine learning models to separate vocal tracks from non-vocal tracks of the audio data. The machine learning model may, in some examples, include a cross-modal text-guided speech separator, such as described with respect to FIG. 6, that breaks the audio into vocal and non-vocal components such that the vocal component can be muted at the target phrase while preserving the background or other audio. In some examples, the separation module 422 may include a neural network with self-attention to cross-attend between audio and text (e.g., caption or script text) to align a maximum correlation between their features.

The soft mute module 424 provides for soft muting of content from audio, that mutes, reduces, or removes the phrase while keeping the background, or other, sound intact; resulting in a smoother audio experience closer to the unedited audio quality. Though described at places herein with respect to videos having associated audio content, the systems and methods are applicable to audio only, including songs or other such content.

To accomplish the soft muting, the soft mute module 424 may use the de-mixed audio data from the separation module 422 and the alignment from the alignment module 420 to identify instances in the vocal content to mute while preserving the non-vocal content.

The alignment module 420, separation module 422, and soft mute module 424 may be embodied in the audio adjustment module 110 of FIG. 1, along with the other modules described in FIG. 4.

The machine learning (ML) module 426 may include one or more machine learning models that may perform one or more tasks as described herein, including de-mixing of audio files, speech recognition, text to speech alignment, and other such processes described herein.

Machine learning may take empirical data as input, such as data from the manually classified audio, and yield patterns or predictions which may be representative of content-auxiliary characteristics associated with the audio and video data. Machine learning systems may take advantage of data to capture characteristics of interest having an unknown underlying probability distribution. Machine learning may be used to identify possible relations between observed variables. Machine learning may also be used to recognize complex patterns and make machine decisions based on input data. In some examples, machine learning systems may generalize from the available data to produce a useful output, such as when the amount of available data is too large to be used efficiently or practically. As applied to the present technology, machine learning may be used to learn which performance characteristics are preserved during a localization process and validate localized content when the performance characteristics are preserved.

Machine learning may be performed using a wide variety of methods of combinations of methods, such as contrastive learning, supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure. Support vector machines (SVMs) and regression are a couple of specific examples of machine learning that may be used in the present technology.

In some examples, the machine learning module 426 may include access to or versions of multiple different machine learning models that may be implemented and/or trained according to the techniques described herein. Any suitable machine learning algorithm may be implemented by the machine learning module 426. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The data module 428 may maintain or be associated with one or more sources of data including text, audio, image, and/or video data accessed from the user device 404, the content server 414, and/or the database 430. The data module 428 may include one or more databases or access to one or more databases including text, audio, image, and/or video data. In some examples, the data module 428 may be configured to manage delivery of video content or other data from the database 430 to the user device 404 via the network(s) 412.

Figure 5:
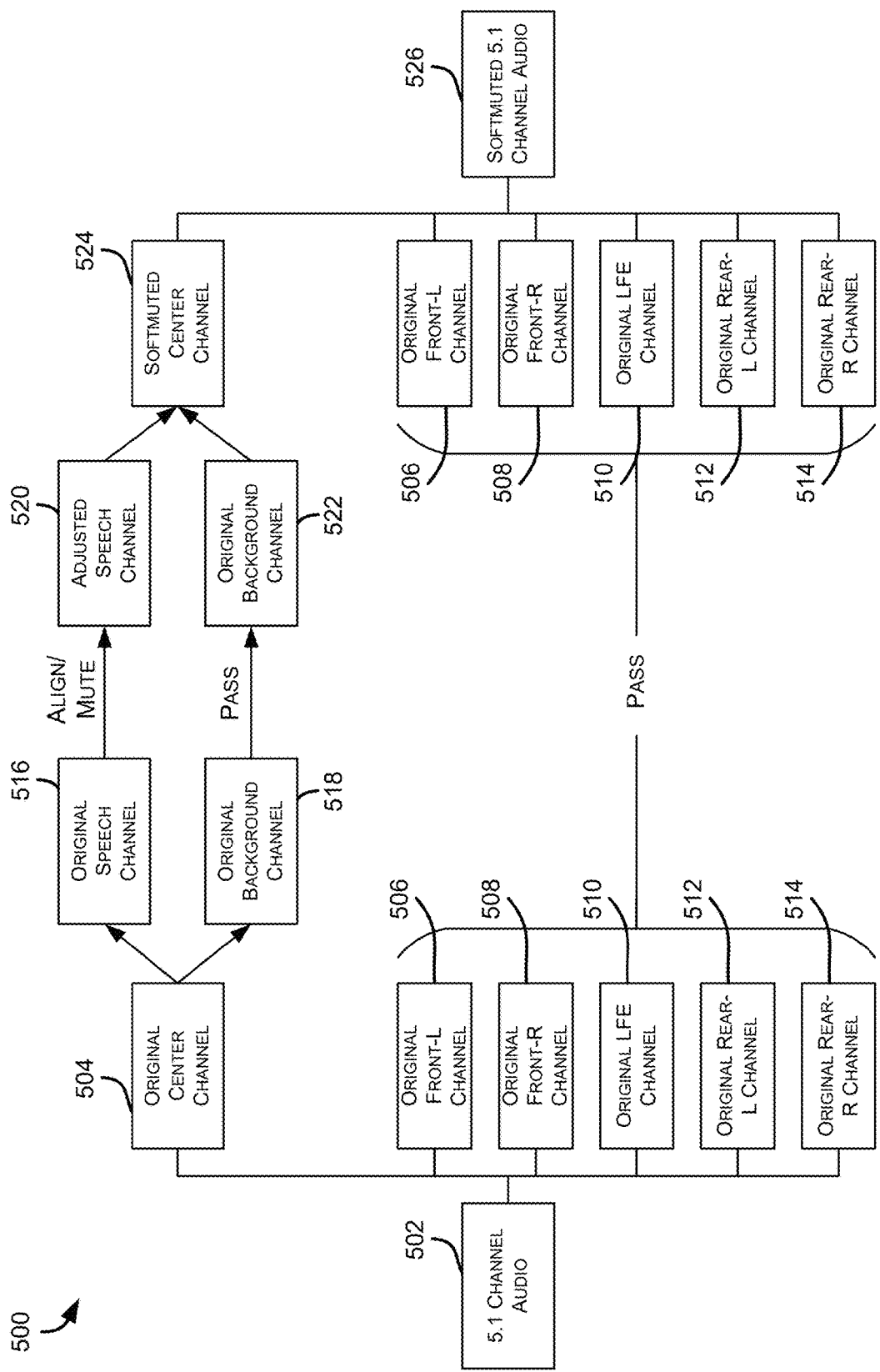
FIG. 5 illustrates an example of audio from an audiovisual file processed to adjust one or more characteristics of the vocal content, according to at least one example.

FIG. 5 illustrates an example of audio 500 from an audiovisual file processed to adjust one or more characteristics of the vocal content, according to at least one example. The audio 500 includes 5.1 channel audio 502 for a video in at least one example. In some examples, other audio configurations and channels may be used other than as depicted in FIG. 5, the methods and systems described herein are intended to accommodate any such configuration. The 5.1 channel audio 502 may include a surround sound configuration and includes a center channel 504, front-left channel 506, front-right channel 508, low frequency equipment channel 510, rear-left channel 512, and rear-right channel 514.

In the example of FIG. 5, the center channel 504 is depicted as having the audio content of interest, such as vocal tracks, while the other channels may include other audio data. In some examples, the other channels may also include vocal data or data of interest and may therefore be processed similar to center channel 504, as described herein. For simplicity, only the center channel 504 is discussed in detail, though the other channels may be similarly treated. The unaffected channels, including the front-left channel 506, front-right channel 508, low frequency equipment channel 510, rear-left channel 512, and rear-right channel 514, may be passed, as-is through the system without processing, to remain untouched at the softmuted 5.1 channel audio 526 produced by the system.

Figure 6:
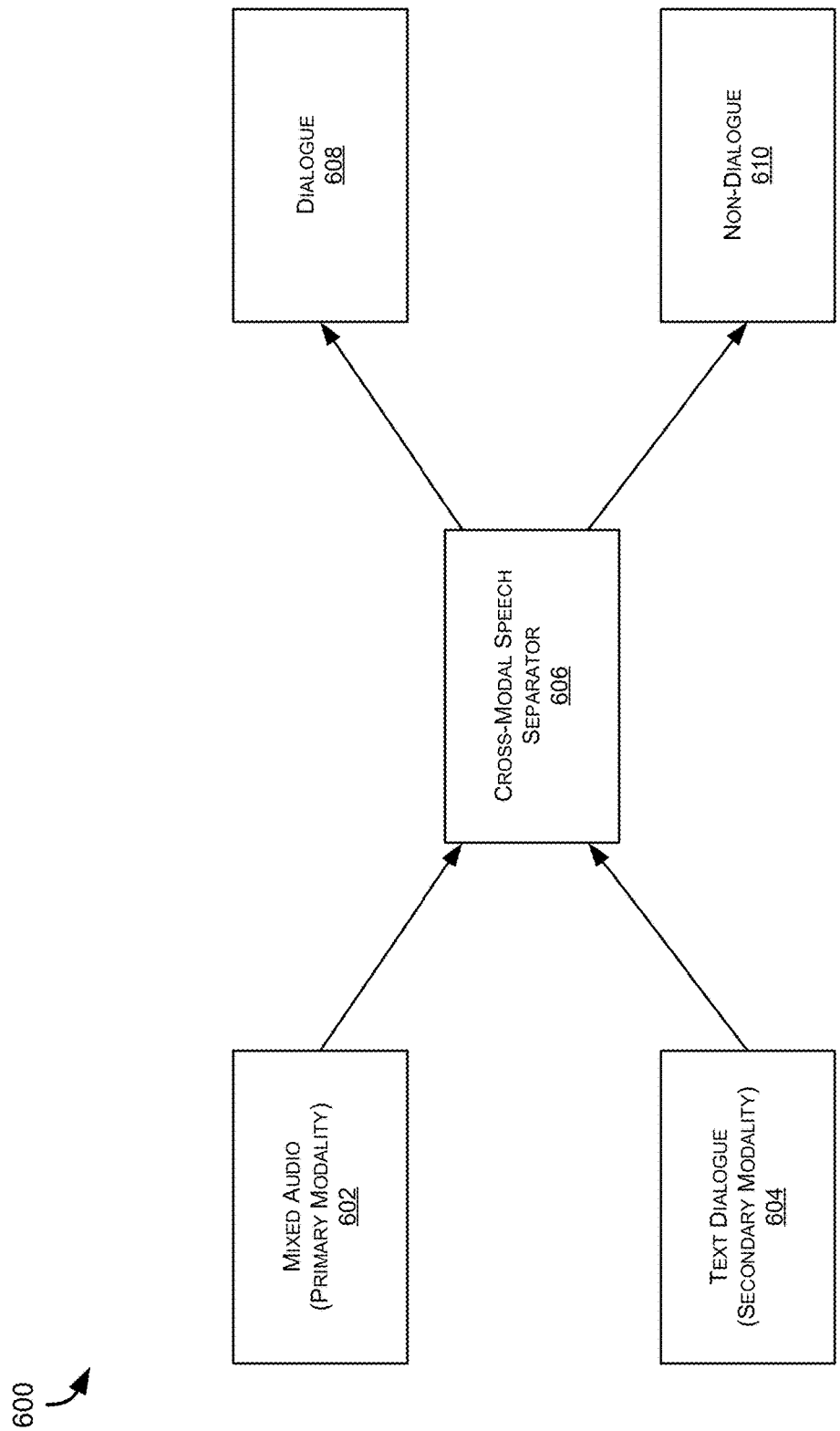
FIG. 6 illustrates an example of a cross-modal speech separator for de-mixing audio content, according to at least one example.

The center channel 504 is separated, for example by the cross-modal speech separator 606 of FIG. 6 or the separation module 422 of FIG. 4. The separated channels include a speech channel 516 and a background channel 518. The background channel 518, in the example of FIG. 5, is passed through and remains unchanged so the background channel 522 is identical to the background channel 518. In some examples, as described herein, the background channel 518 may be adjusted, for example to apply a negative gain to the background channel.

The speech channel 516 may be aligned, by the alignment module 420 according to text associated with the speech, such as a script, caption, lyrics, etc. The speech channel 516 may also be selectively muted, to remove targeted content and produce adjusted speech channel 520. The adjusted speech channel 520 and the background channel 522 may be combined to form the softmuted center channel 524, which is, in turn, re-mixed with the front-left channel 506, front-right channel 508, low frequency equipment channel 510, rear-left channel 512, and rear-right channel 514 to form the softmuted 5.1 channel audio 526.

FIG. 6 illustrates an example 600 of a cross-modal speech separator 606 for de-mixing audio content, according to at least one example. The cross-modal speech separator 606 receives mixed audio 602 (also referred to as a primary modality) and also receives a text dialogue 604 (also referred to as a secondary modality) and outputs speech 608 and non-speech 610 components.

The text and audio data are of different data types, resulting in the cross-modality structure. The cross-modal speech separator 606 may decompose or de-mix the mixed audio 602 by processing through a machine learning system containing a trained neural network. The machine learning system may implement a convolutional neural network (CNN), which has been trained by a plurality of data sets for example including a vocal track, a harmonic/instrumental track and a mix of the vocal track and the harmonic/instrumental track. Examples for conventional machine learning systems capable of separating source tracks such as a singing voice track from a mixed audio signal include: Pretet, "Singing Voice Separation: A study on training data", Acoustics, Speech and Signal Processing (ICASSP), 2019, pages 506-510; "spleeter"—an open-source tool provided by the music streaming company Deezer based on the teaching of Pretet above, "PhonicMind" (https://phonicmind.com) —a voice and source separator based on deep neural networks, "Open-Unmix"—a music source separator based on deep neural networks in the frequency domain, or "Demucs" by Facebook AI Research—a music source separator based on deep neural networks in the waveform domain, described in A. Defossez, et al., "Demucs: Deep extractor for music sources with extra unlabeled data remixed," arXiv: 1909.01174 (2019). These tools accept music files in standard formats (for example MP3, WAV, AIFF) and decompose the song to provide decomposed/separated tracks of the song, for example a vocal track, a bass track, a drum track, an accompaniment track or any mixture thereof.

Accordingly, the cross-modal speech separator 606 may be used, as described herein, to separate the vocal and non-vocal components of the audio data, such that one or more of the components may be adjusted according to the preferences selected by the user.

Figure 7:
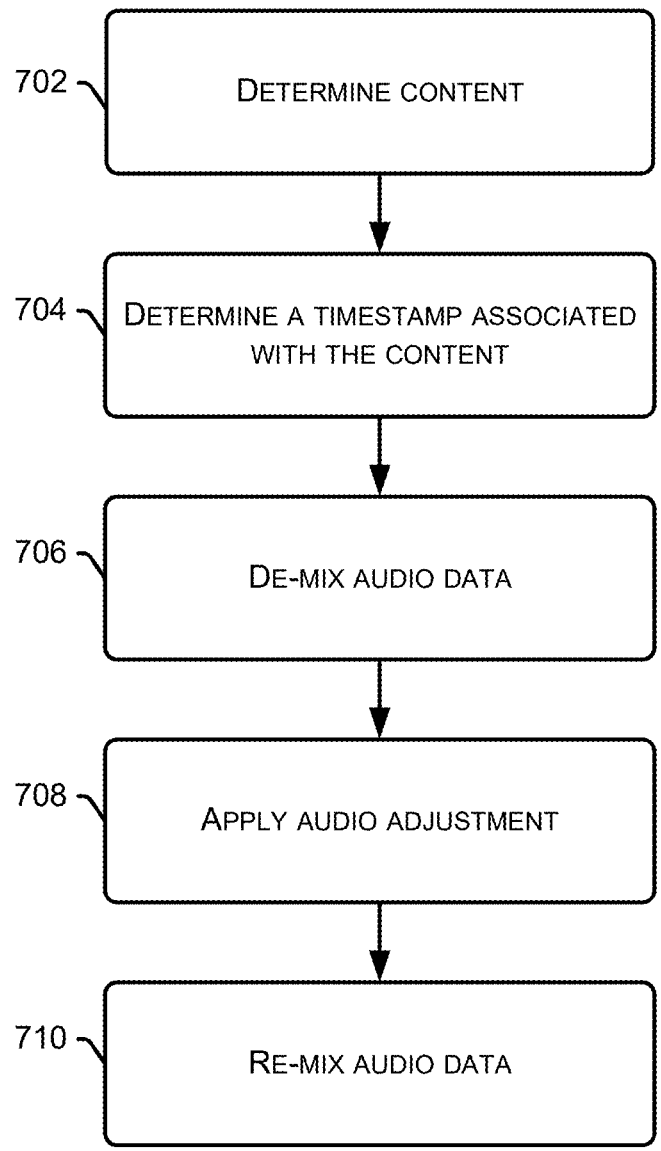
FIG. 7 illustrates an example process for customized audio adjustments through an automated process, according to the present description.

FIG. 7 illustrates a flow diagram of a method according to the present technology. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

FIG. 7 illustrates an example process for customized audio adjustments through an automated process, according to the present description. The process 700 may be carried out by a computing system or device, such as the content server(s) 108 of FIG. 1, the content server 414 of FIG. 4, and/or the computing device 800 of FIG. 8.

At 702, the process 700 includes determining content to target. The target content may be a word that a user wishes to filter out of the content, such as profanity or other terms or phrases that the user wishes to remove for one reason or another. In some examples, the target word or phrase may be a result of a rating associated with the video file, such as a movie rating system based on content to direct users to understand an appropriate audience for the content of the video file.

At 704, the process 700 includes determining a timestamp associated with the content. The timestamp may be identified based on a timestamp associated with a text file that corresponds to the audio data, such as subtitle or script data. The audio and the text data may be aligned together by determining a first alignment of text data with the audio and/or audiovisual data using an automated speech recognition model and refining the alignment by dividing the first audiovisual data into a plurality of segments and processing, using the automated speech recognition model, the plurality of segments.

At 706, the process 700 includes de-mixing the audio data into two or more components. The audio data may be de-mixed into a vocal component and a non-vocal component by inputting the first audio data and text data associated with the first audio data into a cross-modal machine learning separator trained to separate audio data into two components based on sources of the first audio data. The de-mixing may be performed using the separation module 422 and/or cross-modal speech separator 606 as described herein, among other machine learning models trained to separate content.

At 708, the process 700 includes applying an audio adjustment to one or more of the components. Once the vocal and non-vocal components are separated, an audio adjustment may be made to the vocal component at the timestamp to produce an adjusted vocal component, for example to apply negative gain or to mute at the timestamp of the vocal component, removing or reducing the target phrase.

At 710, the process 700 includes re-mixing the audio data for presentation at a user device. The adjusted vocal component and the non-vocal component can be combined to generate second audio data that may be presented with the video file at a user device.

Figure 8:
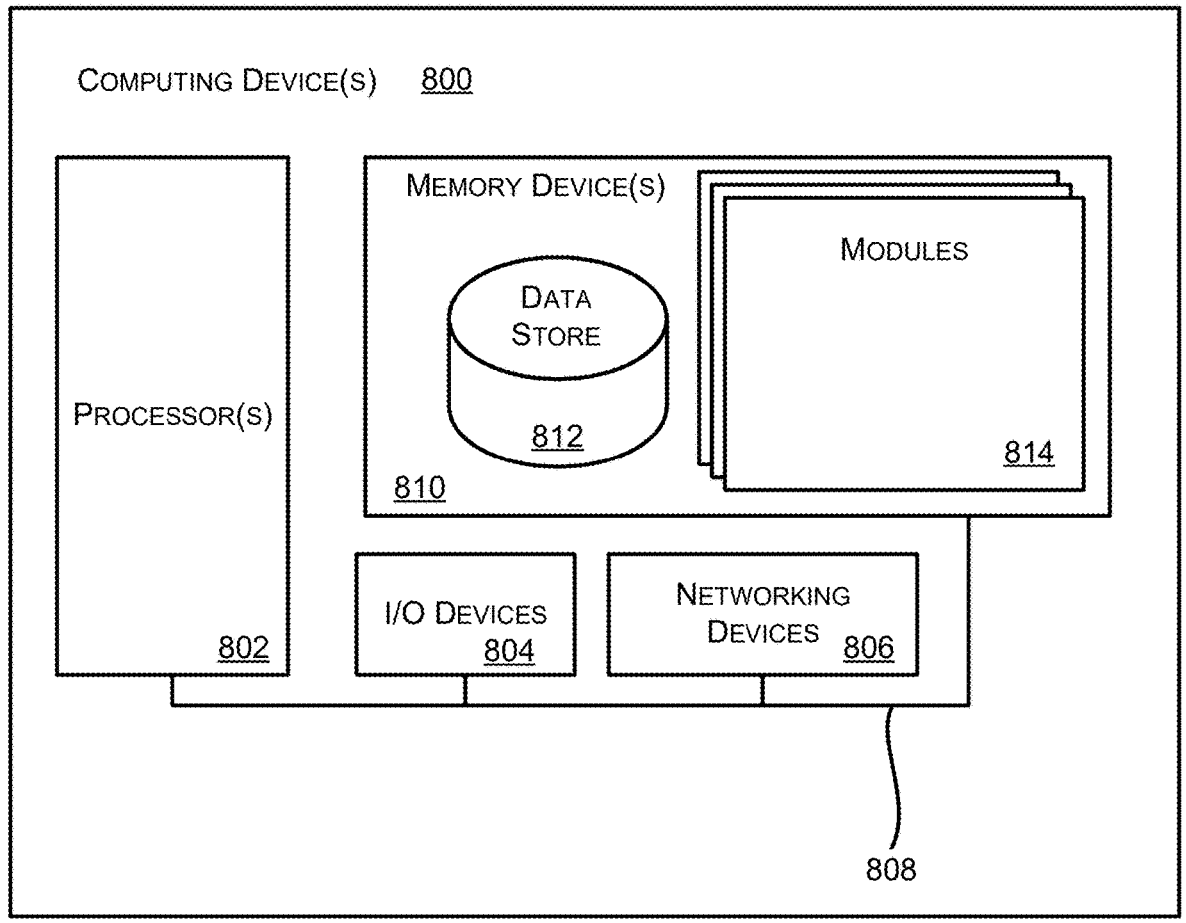
FIG. 8 illustrates a block diagram of a computing system for use with the systems and methods described herein, according to at least one example.

FIG. 8 illustrates a block diagram of a computing device 800 for use in customized audio adjustments, according to the present description. The computing device 800 may include one or more computing devices on which services or modules of this technology may execute. The computing device 800 is illustrated on which a high-level example of the technology may be executed. The computing device 800 may be an example of the content server(s) 108 of FIG. 1. The computing device 800 may include one or more processors 802 that are in communication with memory devices 810. The computing device 800 may include a local communication interface 808 for the components in the computing device. For example, the local communication interface 808 may be a local data bus and/or any related address or control busses as may be desired.

The memory device 810 may contain modules 814 that are executable by the processor(s) and data for the modules 814. The module 814 may include the modules shown and described with respect to FIG. 4, among others. A data store 812 may also be located in the memory device 810 for storing data related to the modules and other applications along with an operating system that is executable by the processor 802.

The computing device 800 may further include or be in communication with a client device, which may include a display device. The client device may be available for an administrator to use in interfacing with the computing device 800, such as to review operation of a virtual computing instance, make improvements to machine learning models and so forth.

Various applications may be stored in the memory device 810 and may be executable by the processor 802. Components or modules discussed in this description that may be implemented in the form of software using high programming level languages that are compiled, interpreted or executed using a hybrid of the methods.

The computing device 800 may also have access to I/O (input/output) devices 804 that are usable by the computing devices. An example of an I/O device 804 is a display screen that is available to display output from the computing devices. Other known I/O devices may be used with the computing device as desired. Networking devices 806 and similar communication devices may be included in the computing device 800. The networking devices 806 may be wired or wireless networking devices 806 that connect to the internet, a LAN, WAN, or other computing network.

The components or modules that are shown as being stored in the memory device 810 may be executed by the processor 802. The term "executable" may mean a program file that is in a form that may be executed by a processor 802. For example, a program in a higher level language may be compiled into machine code in a format that may be loaded into a random access portion of the memory device 810 and executed by the processor 802, or source code may be loaded by another executable program and interpreted to generate instructions in a random access portion of the memory to be executed by a processor 802. The executable program may be stored in any portion or component of the memory device 810. For example, the memory device 810 may be random access memory (RAM), read only memory (ROM), flash memory, a solid-state drive, memory card, a hard drive, optical disk, floppy disk, magnetic tape, or any other memory components.

The processor 802 may represent multiple processors and the memory device 810 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

It is noted that any of the distributed system implementations described above, or any of their components, may be implemented as one or more web services. In some implementations, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke and may define a particular application programming interface (API) to which other systems may be expected to conform when requesting the various operations.

In various implementations, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some implementations, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
   one or more processors; and
   a non-transitory computer-readable medium having instructions stored thereon that, when executed by the one or more processors, cause the one or more processors to perform operations comprising:
      determining, based on a user input indicating a type of content to remove, a target word to identify within first audio data associated with a video file;
      determining a timestamp of the first audio data and the video file associated with the target word by aligning text data associated with the first audio data and identifying the target word within the text data;
      de-mixing the first audio data into a vocal component and a non-vocal component by inputting the first audio data and the text data into a cross-modal machine learning separator trained to separate audio data into two components based on sources of the first audio data;
      applying a first audio adjustment to the vocal component at the timestamp to produce an adjusted vocal component, wherein applying the audio adjustment comprises muting the vocal component at the timestamp to remove the target word;
      applying a second audio adjustment to the non-vocal component, wherein the second audio adjustment comprises applying negative gain to the non-vocal component;
      generating second audio data by combining the adjusted vocal component and the adjusted non-vocal component; and
      presenting the second audio data with the video file at a user device.

2. The system of claim 1, wherein the second audio data comprises:
   the adjusted vocal component with the target word removed; and
   the adjusted non-vocal component.

3. The system of claim 1, wherein de-mixing the first audio data comprises using a machine learning system to decompose the first audio data into the vocal component and the non-vocal component, wherein the vocal component and the non-vocal component are complements, such that a sum of the vocal component and the non-vocal component results in the first audio data.

4. The system of claim 1, wherein determining the target word is based on a first rating associated with the video file, wherein the second audio data has a second rating, different from the first rating, the second rating indicative of the content of the second audio data.

5. A method comprising:
   determining content to identify within first audio data;
   determining a first speech component and a second non-vocal component of the first audio data, the first speech component associated with the content;
   applying a first audio adjustment to the first speech component to produce an adjusted first component, wherein applying the audio adjustment comprises muting the vocal track at a timestamp to remove a target phrase included within the content;
   applying a second audio adjustment to the non-vocal component, wherein the second audio adjustment comprises applying negative gain to the non-vocal component;
   generating second audio data by combining the adjusted first component and the adjusted second component; and
   causing presentation of the second audio data at a display of a user device.

6. The method of claim 5, wherein determining the first component and the second component comprises de-mixing the first audio data using a cross-modal speech separator that receives inputs of the first audio data and text data corresponding to dialogue of the first audio data and outputs the first component and the second component.

7. The method of claim 5, wherein determining the first component and the second component comprises de-mixing the first audio data using a machine learning system to decompose an audio component of the first audio data into the first component and the second component, wherein the first component and the second component are complements, such that a sum of the first component and the second component results in the audio component.

8. The method of claim 5, wherein the first component comprises a vocal track and the second component comprises non-vocal components.

9. The method of claim 5, wherein the first component comprises a target vocal track, the target vocal track associated with a character identified with the content in text data corresponding to dialogue of the first audio data.

10. The method of claim 5, wherein determining the content is based at least in part on a filter list comprising target words input by a user.

11. The method of claim 5, wherein determining the content is based at least in part on a first rating associated with the first audio data, wherein the second audio data has a second rating, different from the first rating, the second rating indicative of the content of the second audio data.

12. The method of claim 5, further comprising determining a timestamp of the first audio data associated with the content, wherein:
   applying the first audio adjustment is based on the timestamp; and
   determining the timestamp comprises determining a first alignment of text data with the first audio data using an automated speech recognition model and determining a second alignment by dividing the first audio data into a plurality of segments and processing, using the automated speech recognition model, the plurality of segments.

13. A non-transitory computer-readable medium having instructions stored thereon that, when executed by one or more processors, cause the one or more processors to perform operations comprising:
   determining content to identify within first audio data;
   determining a first non-vocal component and a second speech component of the first audio data, the second speech component associated with the content;
   applying first audio adjustment to the first component to produce an adjusted first component, wherein the first component comprises non-vocal components and the second component comprises vocal components, and wherein applying the audio adjustment comprises applying negative gain to the non-vocal components;
   applying a second audio adjustment to the second speech component to produce an adjusted second component, wherein applying the second audio adjustment comprises muting a vocal track of the second speech component at the timestamp to remove a target phrase included within the content;
   generating second audio data by combining the adjusted first component and the adjusted second component; and
   causing presentation of the second audio data at a display of a user device.

14. The non-transitory computer-readable medium of claim 13, wherein determining the first component and the second component comprises de-mixing the first audio data using a cross-modal speech separator that receives inputs of the first audio data and text data corresponding to dialogue of the first audio data and outputs the first component and the second component.

15. The non-transitory computer-readable medium of claim 13, wherein determining the content is based at least in part on a first rating associated with the first audio data, wherein the second audio data has a second rating, different from the first rating, the second rating indicative of the content of the second audio data.

16. The non-transitory computer-readable medium of claim 13, the operations further comprising determining a timestamp of the first audio data associated with the content, wherein:
   applying the first audio adjustment is based on the timestamp; and
   determining the timestamp comprises determining a first alignment of text data with the first audio data using an automated speech recognition model and determining a second alignment by dividing the first audio data into a plurality of segments and processing, using the automated speech recognition model, the plurality of segments.

* * * * *